(12) United States Patent
Sugiyama

(10) Patent No.: US 8,913,307 B2
(45) Date of Patent: Dec. 16, 2014

(54) ILLUMINATION APPARATUS AND IMAGE READING APPARATUS

(71) Applicant: Canon Kabushiki Kaisha, Tokyo (JP)

(72) Inventor: Takayuki Sugiyama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/760,366

(22) Filed: Feb. 6, 2013

(65) Prior Publication Data

US 2013/0222866 A1 Aug. 29, 2013

(30) Foreign Application Priority Data

Feb. 24, 2012 (JP) ................. 2012-038583

(51) Int. Cl.
*H04N 1/04* (2006.01)
*F21V 8/00* (2006.01)
*H04N 1/028* (2006.01)

(52) U.S. Cl.
CPC .......... *G02B 6/0011* (2013.01); *H04N 1/02895* (2013.01); *H04N 1/0285* (2013.01); *H04N 1/02855* (2013.01); *H04N 1/02865* (2013.01)
USPC ............................. 358/484; 358/475; 358/474

(58) Field of Classification Search
CPC ............... H04N 1/02815; H04N 2201/02831; H04N 1/028; H04N 1/193; H04N 2201/02884
USPC ......... 358/475, 484, 474, 509, 505, 483, 482, 358/514; 250/234–236, 208.1, 227.11; 399/220, 221; 355/67–71
See application file for complete search history.

(56) References Cited

U.S. PATENT DOCUMENTS

| | | | | |
|---|---|---|---|---|
| 5,810,463 A * | 9/1998 | Kawahara et al. | ............ | 362/601 |
| 6,565,248 B2 * | 5/2003 | Honguh et al. | ............ | 362/560 |
| 7,085,023 B2 * | 8/2006 | Okamoto et al. | ............ | 358/471 |
| 7,538,911 B2 * | 5/2009 | Sakurai et al. | ................ | 358/475 |
| 7,717,598 B2 * | 5/2010 | Kakizaki et al. | .............. | 362/551 |
| 7,760,403 B2 * | 7/2010 | Sakurai | ......................... | 358/484 |
| 7,920,304 B2 * | 4/2011 | Tatsuno et al. | ................ | 358/475 |
| 7,973,983 B2 * | 7/2011 | Lin et al. | ........................ | 358/484 |
| 7,978,379 B2 * | 7/2011 | Fujiuchi et al. | ................ | 358/475 |
| 7,990,584 B2 * | 8/2011 | Ikeda | ............................. | 358/484 |
| 8,035,868 B2 * | 10/2011 | Kaneko | ........................ | 358/475 |
| 8,371,736 B2 * | 2/2013 | Inoue et al. | ................... | 362/610 |
| 8,508,814 B2 * | 8/2013 | Tanaka | ......................... | 358/482 |

(Continued)

FOREIGN PATENT DOCUMENTS

JP 4490805 B2 6/2010
JP 2010219600 A * 9/2010

*Primary Examiner* — Cheukfan Lee
(74) *Attorney, Agent, or Firm* — Rossi, Kimms & McDowell LLP

(57) ABSTRACT

An illumination apparatus configured to illuminate a target surface from a first side and a second side different from the first side, including: a guide; and a reflector, the guide including: incident surface; a surface for totally reflecting beam from the incident surface; a reflecting surface arranged on an opposite side of the incident surface relative to the surface; a first exit for causing the reflected beam to exit as converging beam from the first side, the first exit having condensing action in plane orthogonal to the one-dimensional direction; and a second exit, adjacent to the first exit, having condensing action in the orthogonal plane for causing beam not reflected by the reflecting surface to exit as converging beam, and the reflector reflecting the beam from the second exit to the target surface as beam from the second side.

19 Claims, 7 Drawing Sheets

(56) References Cited

U.S. PATENT DOCUMENTS

| | | | |
|---|---|---|---|
| 8,537,434 B2* | 9/2013 | Takahashi et al. | 358/475 |
| 8,625,170 B2* | 1/2014 | Imoto et al. | 358/474 |
| 2006/0187500 A1* | 8/2006 | Sakurai | 358/474 |
| 2010/0265551 A1* | 10/2010 | Endoh | 358/474 |
| 2011/0096374 A1* | 4/2011 | Takahashi et al. | 358/475 |
| 2012/0287668 A1* | 11/2012 | Richardson et al. | 362/602 |
| 2013/0070312 A1* | 3/2013 | Saiga | 358/474 |
| 2013/0278975 A1* | 10/2013 | Murakami | 358/484 |
| 2013/0278976 A1* | 10/2013 | Murakami | 358/484 |
| 2014/0029256 A1* | 1/2014 | Tanaka | 362/235 |

\* cited by examiner

ILLUMINATION APPARATUS AND IMAGE READING APPARATUS

BACKGROUND OF THE INVENTION

1. Field of the Invention

The present invention relates to an illumination apparatus and an image reading apparatus, and more particularly, to an image reading apparatus for reading an image by a sequential linear scanning method by illuminating a surface of an original, such as an image scanner, copying machine, and a facsimile.

2. Description of the Related Art

There is a demand for smaller size (particularly, lower-profile), lower cost, and higher speed in an image reading apparatus. On this basis, downsizing of a light receiving sensor has been advanced, and in a reduction optical system, reduction magnification has been further decreased. With this change, a sensor surface experiences insufficient illuminance, and in order to obtain the same image quality as that of the conventional technology, there is a need for a brighter original illumination apparatus. In view of this situation, a line-shaped illumination using a light emitting diode (LED) has been developed along with recent improvement of light emission efficiency of the LED.

In the original illumination apparatus, when placing and reading an original that has an uneven surface due to cut and paste on the original surface to be read, a shade is generated at the uneven portion, causing a problem that the reading performance on the original surface is degraded. To cope with this problem, Japanese Patent No. 4490805 and Japanese Patent Application Laid-Open No. 2010-219600 have disclosed an illumination apparatus that reduces the shade of the uneven portion by illuminating from both sides with respect to a reading optical axis by using a line-shaped illumination employing the LED.

The illumination apparatus disclosed in Japanese Patent No. 4490805 and Japanese Patent Application Laid-Open No. 2010-219600 includes a light guide and a reflecting member, and illuminates a surface to be illuminated from a first side and a second side with respect to a normal at the center of the surface to be illuminated. The light guide includes an incident surface into which light from a light source enters, a first exit surface from which a portion of the incident light exits via the reflecting surface, and a second exit surface from which a portion of the incident light exits directly by passing through the inside.

In order to achieve high speed reading, it is required to have illumination efficiency with which a sufficient light amount is obtained on the original surface by condensing the light in a sub-scanning direction (when an array direction of the light source is a main scanning direction, the sub-scanning direction is a direction orthogonal to the array direction). However, in the illumination apparatus disclosed in Japanese Patent No. 4490805 and Japanese Patent Application Laid-Open No. 2010-219600, the first exit surface and the second exit surface have no condensing action for causing a converging light beam to exit in a plane orthogonal to the array direction of the light source. For this reason, the illumination efficiency is poor, and it is hard to obtain a sufficient light amount on the original surface.

In the illumination apparatus disclosed in Japanese Patent No. 4490805, the incident surface, rather than the exit surface, is formed in a convex shape on the light source side to have a condensing action. In this case, only light within a small angle range of the incident light beam enters the light guide, and other surrounding light does not enter the light guide, resulting in poor illumination efficiency. In order to solve this problem, it is required to increase the size of the incident surface, which is an obstacle in achieving the smaller size, particularly the lower-profile.

SUMMARY OF THE INVENTION

According to an exemplary embodiment of the present invention, there is provided an illumination apparatus configured to illuminate a surface to be illuminated from a first side and a second side different from the first side, the illumination apparatus including: a light guide; and a reflecting member, in which the light guide include: an incident surface into which a light beam from a light source arranged in a one-dimensional direction enters; a side surface for totally reflecting a portion of the light beam which enters the incident surface; a reflecting surface arranged on an opposite side of the incident surface with respect to the side surface; a first exit surface for causing a light beam reflected by the reflecting surface to exit as a converging light beam, the first exit surface having a condensing action in a plane orthogonal to the one-dimensional direction, the converging light beam emitted from the first exit surface illuminates the surface to be illuminated as a light beam from the first side; and a second exit surface for causing a light beam from the light source, which is not reflected by the reflecting surface, to exit as a converging light beam, the second exit surface having a condensing action in the plane orthogonal to the one-dimensional direction, and in which the reflecting member is configured to reflect the light beam from the second exit surface to the surface to be illuminated as a light beam from the second side.

Further features of the present invention will become apparent from the following description of exemplary embodiments with reference to the attached drawings.

DESCRIPTION OF THE EMBODIMENTS

Exemplary embodiments of the present invention are described in detail below with reference to the accompanying drawings.

First Embodiment

Image Reading Apparatus

Figure 2:
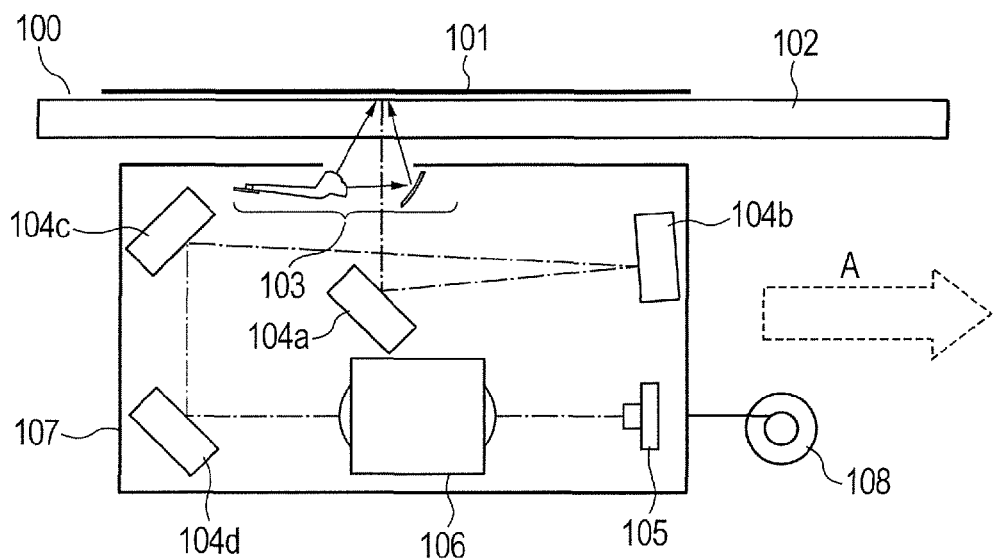
FIG. 2 is a cross-sectional view of an image reading apparatus including the illumination apparatus according to an embodiment of the present invention, illustrating a schematic configuration of the image reading apparatus.

FIG. 2 is a schematic diagram of a main section of an image reading apparatus including an illumination apparatus according to an embodiment of the present invention, illustrating a basic configuration of the image reading apparatus. An integral scanning optical system unit (hereinafter, also referred to as "carriage") 107 includes an illumination apparatus 103 for illuminating an original 101 placed on an original table glass (original table) 102 and a reading unit (line sensor or image sensor) 105 for reading a light beam from the original 101. The integral scanning optical system unit 107 further includes multiple turnback mirrors 104a to 104d for guiding the light beam from the original 101 to the reading unit 105, an image forming optical system (imaging lens) 106 for imaging the light beam based on image information from the original 101 on a surface of the reading unit 105, and the like.

The integral scanning optical system unit 107 configured in the above manner is moved for scanning in a direction (sub-scanning direction) of an arrow A illustrated in FIG. 2 by a driving motor (sub-scanning motor) 108 serving as a drive unit. Each element constituting the integral scanning optical system unit 107 does not change the relative position relationship between the elements while scanning the original.

As illustrated in FIG. 2, each mirror is arranged so that the light beam from the original 101 enters the second turnback mirror 104b from the first turnback mirror 104a, enters the third turnback mirror 104c from the second turnback mirror 104b, and then enters the fourth turnback mirror 104d from the third turnback mirror 104c. The light beam which enters the fourth turnback mirror 104d is then imaged on the surface of the reading unit 105 by the image forming optical system 106.

In the above-mentioned configuration, the image information of the original read by the reading unit 105 is sent to a specific image processor (not shown) as an electrical signal, and then is output after being subjected to specific signal processing. The image reading apparatus further includes a power source unit (not shown) for driving the apparatus.

(Illumination Apparatus)

Figure 1:
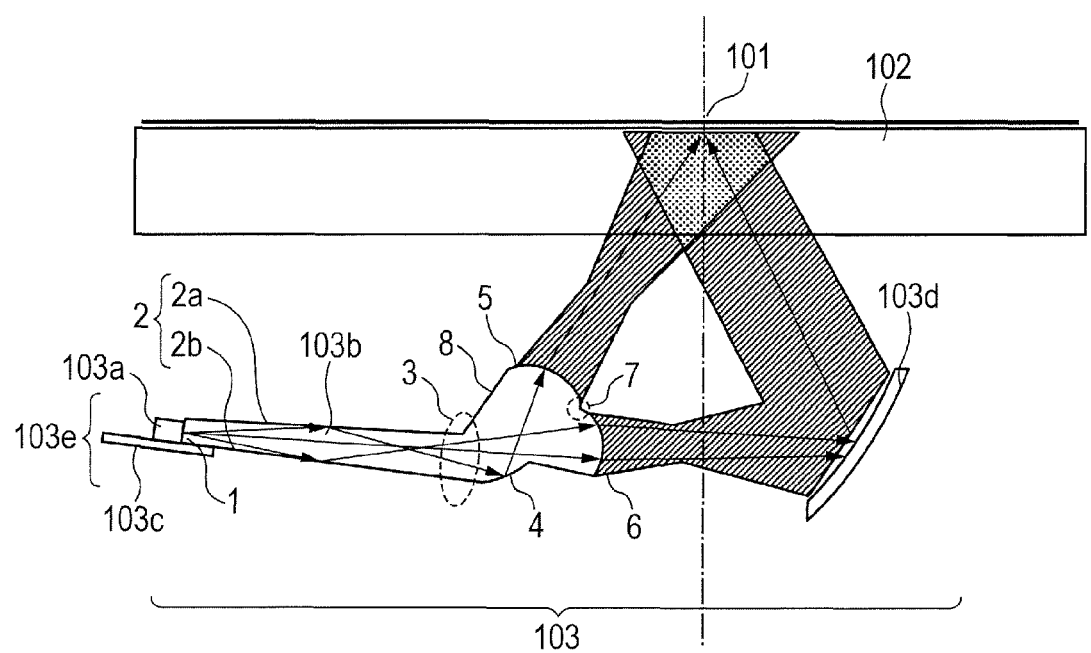
FIG. 1 is a sub-scanning cross-sectional view of an illumination apparatus according to a first embodiment of the present invention.

The illumination apparatus according to this embodiment is described below with reference to FIG. 1. FIG. 1 is a sub-scanning cross-sectional view of the illumination apparatus 103 according to this embodiment. The illumination apparatus 103 includes a light source unit 103e (an LED array in which multiple white LEDs 103a, which are light emitting elements, are arranged in one-dimensional direction (main scanning direction that is perpendicular to the plane of the drawing sheet of FIG. 1), a light guide 103b, a substrate 103c, and a reflecting member 103d.

The substrate 103c holds the light source unit 103e and the light guide 103b in an integrated manner. The reflecting member 103d is arranged at a position substantially symmetrical to the light guide 103b with respect to a reading optical axis that is a normal at the center of the illuminated surface of the original 101, which is the surface to be illuminated. The light guide 103b is formed of an optical synthetic resin member such as plastic, and the reflecting member 103d is formed of a high-reflection aluminum member.

(Light Guide)

The light guide 103b as one of the structural elements constituting the illumination apparatus 103 is described below with reference to FIG. 1. In a cross section orthogonal to the array direction (main scanning direction) of the light source that is arranged in one-dimensional direction (in the plane of the drawing sheet of FIG. 1), the light beam from the light source unit 103e enters an incident surface 1, which is a planar surface. The light beam is then guided between side surfaces 2 (2a, 2b), and a portion of the light beam passed through an end region 3 of the side surface 2 is reflected by a reflecting surface 4 and guided to a first exit surface 5 that has a condensing action for causing the light beam to exit as a converging light beam. The light beam from the first exit surface 5 illuminates the surface of the original 101 as a light beam from a first side with respect to the normal at the center of the illuminated surface of the original 101, which is the surface to be illuminated.

On the other hand, a portion of the light beam passed through the end region 3 of the side surface 2 and not reflected by the reflecting surface 4 is guided to a second exit surface 6 that has a condensing action for causing the light beam to exit as a converging light beam to the reflecting member 103d that is arranged on the opposite side with respect to the reading optical axis. The light beam from the second exit surface 6 illuminates the surface of the original 101 via the reflecting member 103d, as a light beam from a second side with respect to the normal at the center of the illuminated surface of the original 101, which is the surface to be illuminated.

The side surface 2 includes a side surface 2a that totally reflects a light beam traveling in a direction close to the surface of the original 101 from the incident surface 1 and a side surface 2b that totally reflects a light beam traveling in a direction away from the surface of the original 101 from the incident surface 1, in the cross section orthogonal to the array direction of the light source. The side surface 2 then combines the light beam from the incident surface 1 totally reflected by at least one of the side surfaces 2a or 2b and a light beam directly passing from the incident surface 1 without being reflected by the side surfaces 2a and 2b at the end region 3 of the side surface 2.

The reflecting surface 4 is provided on the opposite side of the incident surface 1 with respect to the side surface 2, and the first and second exit surfaces 5 and 6 are each provided at a position with a predetermined distance from the end region 3 of the side surface 2. The first and second exit surfaces 5 and 6 are arranged at positions adjacent to each other so that a separating boundary 7 between the first and second exit surfaces 5 and 6 defines a concave portion.

The first exit surface 5 is formed into a curved shape convex outwardly, and has a positive power for once converging the light beam from the reflecting surface 4 before the light beam reaches the surface of the original 101, which is an illumination position. By once converging the light beam so that the light beam is narrowed, a distance from the first exit surface 5 to the surface of the original 101 can be shortened while increasing the condensing efficiency in the sub-scanning direction, i.e., the lower-profile can be achieved.

The second exit surface 6 is formed into a curved shape which is convex outwardly. The second exit surface 6 has a positive power for once converging the light beam that passes through the end region 3 of the side surface 2 and does not travel toward the reflecting surface 4 before the light beam reaches the reflecting member 103d that is arranged at the position substantially symmetrical with respect to the reading optical axis. In the same manner as the first exit surface 5, by once converging the light beam so that the light beam is narrowed, a distance from the second exit surface 6 to the reflecting member 103d can be shortened, and the size of the reflecting member 103d can be reduced. Thus, the lower-profile can be achieved.

In this manner, the positive power for making the exiting light beam once converged to be narrowed is considerably strong. Therefore, the separating boundary 7 between the first and second exit surfaces 5 and 6 arranged adjacent to each other defines the concave portion. Further, the following Expression (1) is satisfied:

$$0.6 < \phi_1/\phi_2 < 0.95, \tag{1}$$

where $\phi_1$ represents the refractive power (power) of the first exit surface 5 of the light guide and $\phi_2$ represents the refractive power (power) of the second exit surface 6 of the light guide.

In this embodiment, specific curvature radii are, for example: curvature radius R=1.8 mm at the first exit surface 5; and curvature radius R=1.7 mm at the second exit surface 6, and Expression (1) is satisfied with, for example, $\phi_1$=0.27, $\phi_2$=0.30 and $\phi_1/\phi_2$=0.89. Expression (1) defines two powers of the first exit surface 5 and the second exit surface 6 of the light guide 103b. When the powers are within the range of Expression (1), the condensing action of the first and second exit surfaces 5 and 6 for making the light beam converged can be effectively used, and as a result, the condensing efficiency at the surface of the original 101 can be increased and the illumination apparatus can be downsized.

However, when the powers are deviated from the range satisfying the condition of Expression (1), the condensing action for making the light beam converged becomes too strong or too weak. As a result, the condensing efficiency at the surface of the original 101 is poor, and the downsizing of the illumination apparatus in both height direction and width direction can hardly be achieved in the cross section orthogonal to the array direction of the light source (in the plane of the drawing sheet of FIG. 1).

In this embodiment, the reflecting surface 4 is formed into a curved shape having a positive power, which can be used by being combined with the positive power, which is the condensing action, of the first exit surface 5. Therefore, the reflecting surface 4 contributes to the reduction of the distance from the first exit surface 5 to the surface of the original 101 while increasing the condensing efficiency in the sub-scanning direction. In this embodiment, a specific curvature radius of the reflecting surface 4 is, for example, 22 mm.

(Power of Illumination System in Main Scanning Direction)

Figure 3:
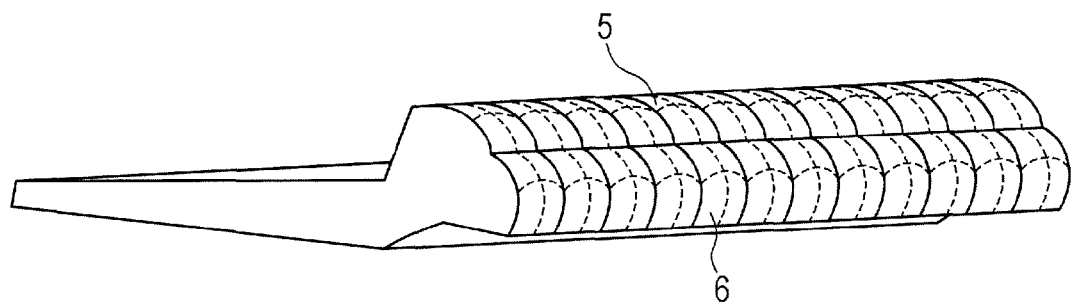
FIG. 3 is a perspective view of a light guide of the illumination apparatus according to the first embodiment of the present invention.

As illustrated in FIG. 3, in this embodiment, in order to improve an angle characteristic on the surface of the original in the main scanning direction, i.e., in order to reduce unevenness in illuminance in the main scanning direction, the first light exit surface 5 and the second exit surface 6 are configured to have the power (refractive power) in the main scanning direction. Specifically, multiple toric surface regions each having a curvature in the main scanning direction are formed on each of the first exit surface 5 and the second exit surface 6. With this configuration, in the region having the curvature in the main scanning direction, the light beam illuminates the original 101 by being once converged and then diverged. As a result, the unevenness in illuminance in the main scanning direction can be reduced.

(Reflecting Member)

As illustrated in FIG. 1, the light beam which exits from the second exit surface 6 of the light guide 103b enters the reflecting member 103d that is arranged at the position substantially symmetrical to the light guide 103b with respect to the reading optical axis that is the normal at the center of the surface to be illuminated. The light beam which enters the reflecting member 103d is reflected by the reflecting member 103d, and illuminates the original 101. In order to efficiently illuminate the surface of the original 101, the reflecting member 103d is formed into a curved shape having a power (refractive power) in the cross section orthogonal to the main scanning direction (in the plane of the drawing sheet of FIG. 1). Specifically, in this embodiment, a curvature radius of the reflecting member 103d is, for example, 50 mm.

(Illuminance Distribution)

Figure 4:
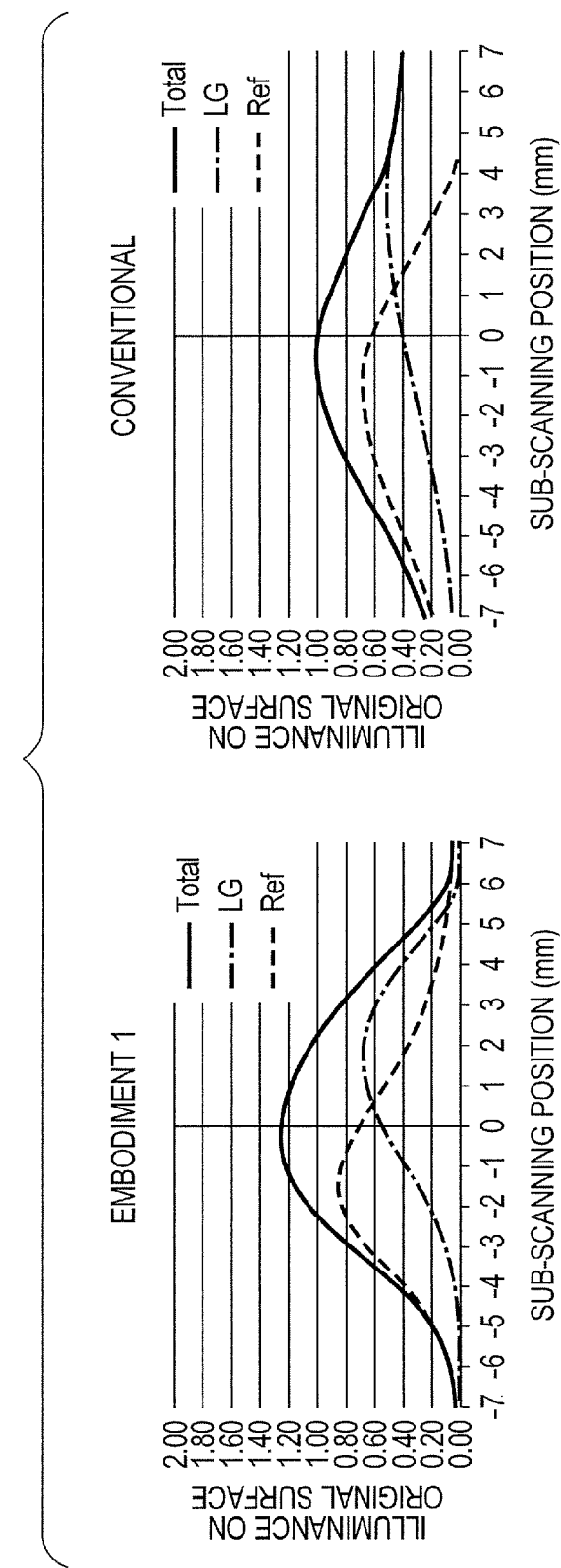
FIG. 4 shows a comparison of light amount between the first embodiment of the present invention and a conventional example.
Figure 5:
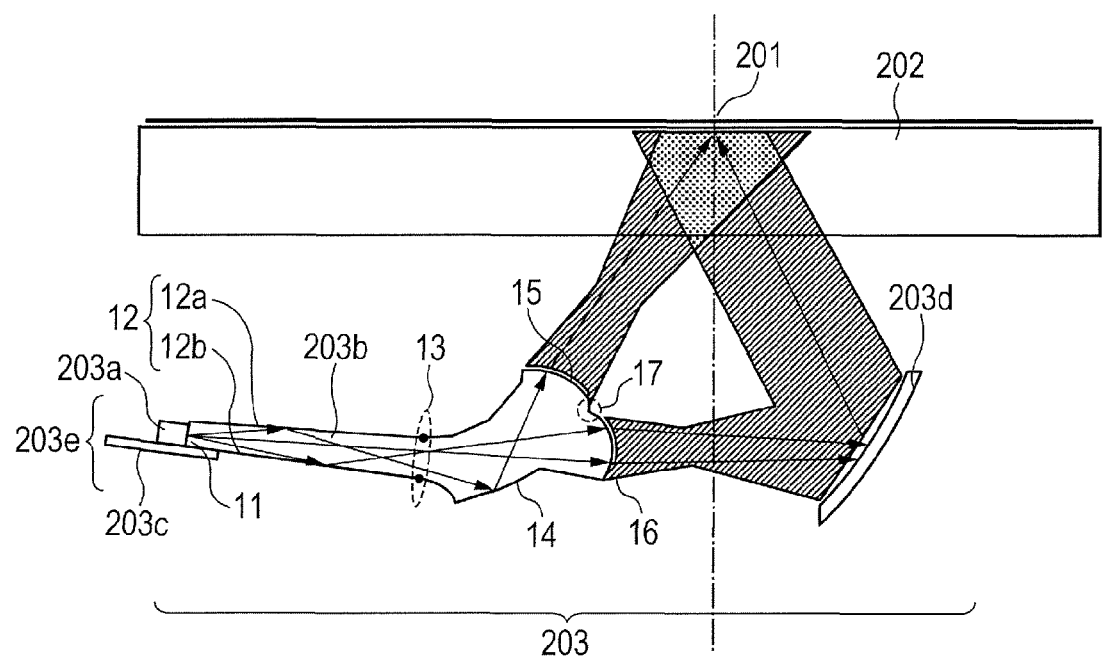
FIG. 5 is a sub-scanning cross-sectional view of an illumination apparatus according to a second embodiment of the present invention.
Figure 6:
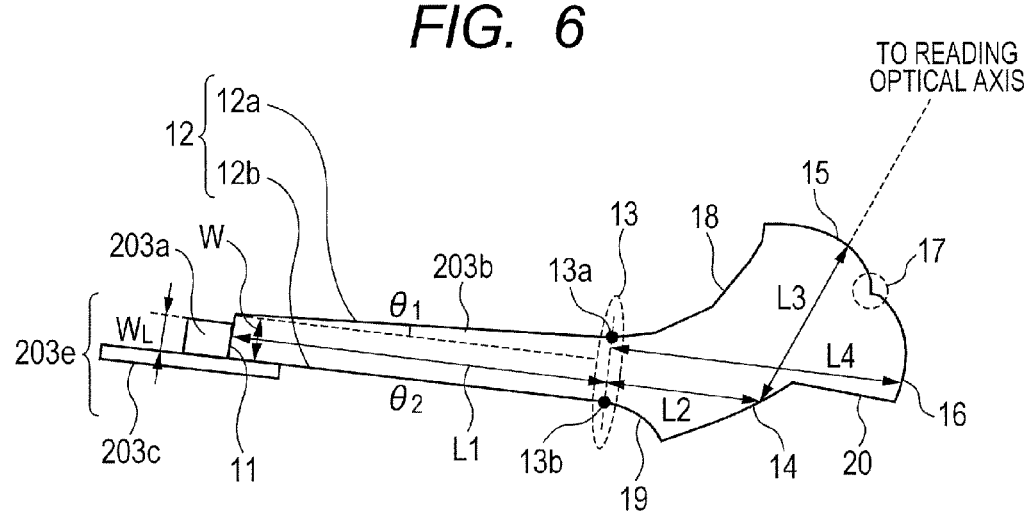
FIG. 6 is a sub-scanning cross-sectional view of a light guide of the illumination apparatus according to the second embodiment.
Figure 10:
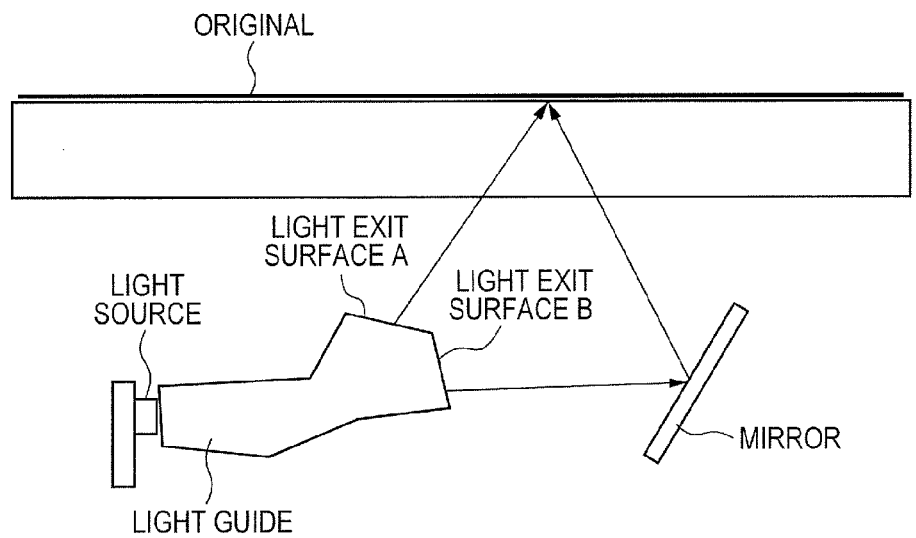
FIG. 10 is a sub-scanning cross-sectional view of an illumination apparatus according to the conventional example.

FIG. 4 shows illuminance distribution of this embodiment and a configuration illustrated in FIG. 10 in the surface of the original in a direction (sub-scanning direction) orthogonal to the main scanning direction. The configuration illustrated in FIG. 10 is obtained by modifying a configuration of a conventional example to a configuration similar to that of this embodiment. Both exit surfaces A and B illustrated in FIG. 10 are planar surfaces. As is apparent from FIG. 4, the condensing efficiency in the direction (sub-scanning direction) orthogonal to the main scanning direction can be greatly improved Second Embodiment FIGS. 5 and 6 are a sub-scanning cross-sectional view of an illumination apparatus and an explanatory diagram of a light guide 203b of the illumination apparatus according to a second embodiment of the present invention, respectively. An image reading apparatus according to the second embodiment is the same as that of the first embodiment, and therefore, a description thereof is omitted. In this embodiment, unlike the first embodiment, in order to further increase the light usage efficiency of the light guide 203b, connecting surfaces 18 and 19 connected from an end region 13 of a side surface 12 are configured to be continuously flared to outer sides as illustrated in FIG. 6.

In this embodiment, specific curvature radii R are, for example: R=30 mm at a reflecting surface 14; R=2.15 mm at a first exit surface 15; and R=1.95 mm at a second exit surface 16. Powers $\phi_1$ and $\phi_2$ of the exit surfaces 15 and 16 are 1=0.23 and $\phi_2$=0.25, respectively, and $\phi_1/\phi_2$=0.91, satisfying Expression (1). In addition, a curvature radius R of a reflecting member 203d is, for example, 40 mm.

(End Region of Side Surface and Connecting Surface of Light Guide)

As illustrated in FIG. 6, a light beam from a light source unit 203e enters an incident surface 11 of the light guide 203b, and is totally reflected by side surfaces 12a and 12b multiple times. This total reflection state can be considered equivalent to the following. That is, regarding a width W of the incident surface, multiple mirror image light sources are formed on outer sides of the side surfaces 12a and 12b by the side surfaces 12a and 12b, and light beams from these mirror image light sources travel in a straight line to an end portion of the side surface 12 at respective incident angles.

In this manner, a position where the light beams are condensed in the same manner as an aperture position is formed as an end region 13 of the side surface 12. Direct light from the light source unit 203e (light without being reflected by the side surface 12) and totally reflected light (light that is totally reflected by the side surfaces 12 once or more and combined) pass through the end region 13 of the side surface 12.

An end portion position 13a of the side surface 12a is a boundary position with the connecting surface 18 that is connected to the first exit surface 15, and an end portion position 13b of the side surface 12b is a boundary position with the connecting surface 19 that is connected to the reflecting surface 14. In this embodiment, the connecting surfaces 18 and 19 are continuously connected from the end portion positions 13a and 13b of the side surface 12, respectively, so as to be flared to the outer sides. With this configuration, the light beam restricted to some degree and combined at the end region 13 of the side surface 12 reaches the reflecting surface 14 and the second exit surface 16 without being blocked. Thus, the light beam can be efficiently condensed. Further, owing to the continuous connection, a molding can be easily performed when forming the light guide with an optical synthetic resin member.

In addition, a connecting surface 20 that is connected from the reflecting surface 14 to the second exit surface 16 is also configured to be flared to an outer side. In the similar manner, the light beam traveling toward the second exit surface 16 reaches the second exit surface 16 without being blocked by the light guide. Thus, the light beam can be efficiently condensed. That is, the light beam restricted in the first embodiment can be efficiently used, and hence the optical efficiency of the light guide can be further improved.

(Configurations of Incident Surface, Side Surface, Reflecting Surface, and Exit Surface)

As illustrated in FIG. 6, in the cross section orthogonal to the main scanning direction, a width of a light emitting element 203a is represented by WL, and a width of the incident surface 11 of the light guide 203b is represented by W. Further, a distance from the incident surface 11 to the end region 13 of the side surface 12 in a direction of a light incident axis of the incident surface is represented by L1, and a distance from the end region 13 of the side surface 12 to the reflecting surface 14 in the direction of the light incident axis of the incident surface is represented by L2. In this case, the light guide is configured to satisfy the following Expressions (2) and (3).

$$WL < W \quad (2)$$

$$0 < W/(L1+L2) < 0.15 \quad (3)$$

In this embodiment, specifically, WL=0.9 mm, W=0.95 mm, L1=8.6 mm, L2=4 mm, and W/(L1+L2)=0.08, satisfying Expressions (2) and (3).

Expression (2) defines influence on mounting accuracy of the light emitting element 203a with respect to the light guide. When Expression (2) is not satisfied, unless the mounting accuracy of the light emitting element 203a is kept stringent, light leaked from the incident surface 11 is increased, resulting in degradation of an optical coupling efficiency to the light guide 203b. Expression (3) defines a ratio of a light amount of the light totally reflected and combined by the side surface 12 and a light amount of the light combined without being totally reflected, among the lights traveling toward the reflecting surface 14 and the second exit surface 16 of the light guide 203b.

When the light totally reflected and combined by the side surface 12 of the light guide 203b and the light combined without being totally reflected are determined in the range satisfying Expression (3), light beams of various angles are employed as an effect of the total reflection. Therefore, when the light is condensed by the reflecting surface 14 and the first and second exit surfaces 15 and 16 to illuminate an original 201, it is possible to illuminate the original 201 from various angles in the cross section orthogonal to the main scanning direction. With this configuration, even when reading an original such as a glossy original, the image can be read with high accuracy.

However, when the condition of Expression (3) is not satisfied, more direct light from the light emitting element 203a reaches the end region 13 of the side surface 12 than the light totally reflected by the side surface 12. Therefore, illumination light from a specific angle is increased among the light beams illuminating the original, thus, when reading an original such as a glossy original, the image can hardly be read with high accuracy.

In addition, the light guide is configured so as to satisfy the following Expression (4):

$$0 < ((L1 \tan \theta 1) + (L1 \tan \theta 2))/(L1+L2) < 0.13 \quad (4)$$

where, as illustrated in FIG. 6, in the cross section orthogonal to the main scanning direction, $\theta 1$ represents an angle between the side surface 12a of the light guide 203b closer to the surface of the original 201 and the light incident axis and $\theta 2$ represents an angle between the side surface 12b farther from the surface of the original 201 and the light incident axis.

In this embodiment, specifically, $\theta 1 = 4.1°$, $\theta 2 = 0°$, and $((L1 \tan \theta 1) + (L1 \tan \theta 2))/(L1+L2) = 0.05$, satisfying Expression (4).

In the same manner as Expression (3), Expression (4) defines a ratio of a light amount of the light totally reflected and combined by the side surface 12 and a light amount of the light combined without being totally reflected, among the light beams traveling toward the reflecting surface 14 and the second exit surface 16 of the light guide 203b. A point different from Expression (3) is that the ratio is defined by an angle with which the side surface 12 is broadened, rather than the width W of the incident surface; however, the effect is the same.

When the light totally reflected and combined by the side surface 12 of the light guide and the light combined without being totally reflected are determined in the range satisfying Expression (4), light beams of various angles are employed as an effect of the total reflection. Therefore, when the light is condensed by the reflecting surface 14 and the first and second exit surfaces 15 and 16 to illuminate the original 201, it is possible to illuminate the original 201 from various angles in the cross section orthogonal to the main scanning direction. With this configuration, even when reading an original such as a glossy original, the image can be read with high accuracy; however, when Expression (4) is not satisfied, the image can hardly be read with high accuracy.

In addition, the light guide is configured so as to satisfy the following Expressions (5), (6), and (7):

$$0.15 < L2/L1 < 0.8 \quad (5)$$

$$0.5 < L3/L2 < 1.5 \quad (6)$$

$$1.2 < L4/L2 < 2.5 \quad (7)$$

where, as illustrated in FIG. 6, in the cross-section orthogonal to the main-scanning direction, L3 represents a distance from the reflecting surface 14 to the first exit surface 15 of the light guide 203b, and L4 represents a distance from the end region 13 of the side surface 12 to the second exit surface 16 in the direction of the light incident axis of the incident surface.

In this embodiment, specifically, L3=3.95 mm, L4=7.8 mm, L2/L1=0.47, L3/L2=0.99, and L4/L2=1.95, satisfying Expressions (5), (6), and (7).

Expressions (5), (6), and (7) are described below. Expression (5) defines a ratio of the distance from the incident surface 11 to the end region 13 of the side surface 12 of the light guide 203b in the direction of the light incident axis of the incident surface and the distance from the end region 13 of the side surface 12 to the reflecting surface 14 of the light guide 203b in the direction of the light incident axis of the incident surface. By satisfying the range of Expression (5), the reflecting surface 14 can be effectively used.

When the ratio falls below the lower limit value of Expression (5), the distance from the end region 13 of the side surface 12 to the reflecting surface 14 of the light guide 203b becomes too close. Therefore, the light beam passed through the end region 13 of the side surface 12 reaches the reflecting surface 14 without being separated well, and as a result, the reflecting surface 14 cannot be used effectively for each light. Further, when the ratio exceeds the upper limit value of Expression (5), the size of the reflecting surface 14 is increased to effectively use the light beam passed through the end region 13 of the side surface 12.

Expression (6) defines a ratio of the distance from the end region 13 of the side surface 12 to the reflecting surface 14 of the light guide 203b in the direction of the light incident axis of the incident surface and the distance from the reflecting surface 14 to the first exit surface 15. By satisfying the range of Expression (6), the first exit surface 15 can be effectively used. When the ratio falls below the lower limit value of Expression (6), the distance from the reflecting surface 14 to the first exit surface 15 of the light guide 203b becomes too close. Therefore, the light beam passed through the reflecting surface 14 reaches the first exit surface 15 without being separated well, and as a result, the first exit surface 15 cannot be used effectively for each light.

When the ratio exceeds the upper limit value of Expression (6), the size of the first exit surface 15 is increased to effectively use all of the light beams reflected by the reflecting surface 14.

Expression (7) defines a ratio of the distance from the end region 13 of the side surface 12 to the reflecting surface 14 of the light guide 203b and the distance from the end region 13 of the side surface 12 to the second exit surface 16 of the light guide 203b in the direction of the light incident axis of the incident surface. By satisfying the range of this expression, the second exit surface 16 can be effectively used.

When the ratio falls below the lower limit value of Expression (7), the distance from the reflecting surface 14 to the second exit surface 16 of the light guide 203b becomes too close. Therefore, the light beam which enters the reflecting surface 14 and the light beam which enters the second exit surface 16 respectively enter the reflecting surface 14 and the second exit surface 16 without being separated well, and as a result, the reflecting surface 14 and the second exit surface 16 cannot be used effectively for each light. When the ratio exceeds the upper limit value of Expression (7), the size of the second exit surface 16 is increased to effectively use all of the light beams which enter the second exit surface 16.

(Power of Illumination System in Main Scanning Direction)

Figure 7:
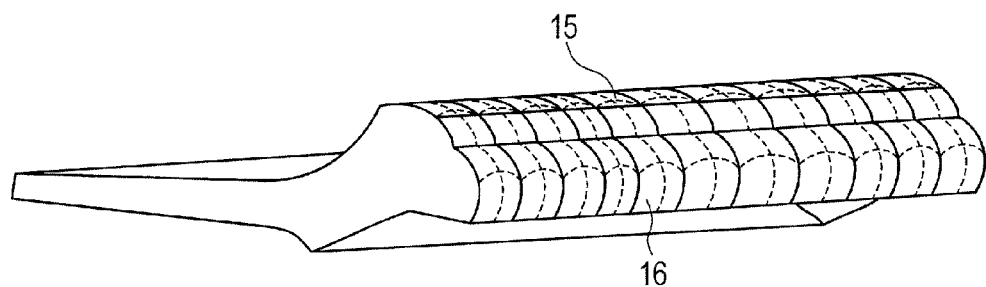
FIG. 7 is a perspective view of the light guide of the illumination apparatus according to the second embodiment.

In the same manner as the first embodiment, as illustrated in FIG. 7, in this embodiment as well, in order to improve the angle characteristic on the surface of the original in the main scanning direction, the first exit surface 15 and the second exit surface 16 are configured to have the power in the main scanning direction. Specifically, multiple toric surface regions each having a curvature in the main scanning direction are provided, and an interval of the toric surface regions is changed based on the arrangement of the LEDs in the main scanning direction. With this configuration, the unevenness in illuminance in the main scanning direction can be reduced.

The shape in the main scanning direction may be changed to change the powers of the first exit surface 15 and the second exit surface 16 in the main scanning direction. In this manner, by changing at least one of the interval of the toric surface regions in the main scanning direction and the powers of the toric surface regions in the main scanning direction, the unevenness in illuminance in the main scanning direction can be reduced.

(Illuminance Distribution)

Figure 8:
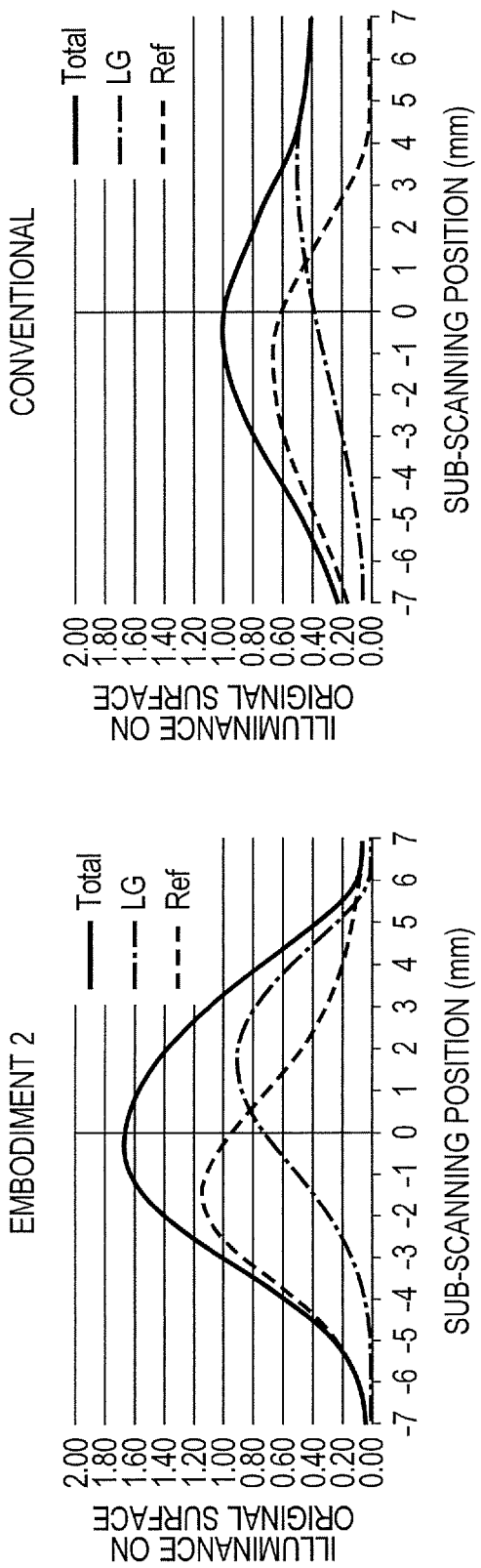
FIG. 8 shows a comparison of light amount between the second embodiment and the conventional example.

FIG. 8 shows illuminance distribution of this embodiment and a conventional example in the surface of the original in a direction (sub-scanning direction) orthogonal to the main scanning direction. As is apparent from FIG. 8, the condensing efficiency in the direction (sub-scanning direction) orthogonal to the main scanning direction can be improved more than the first embodiment.

Third Embodiment

Figure 9:
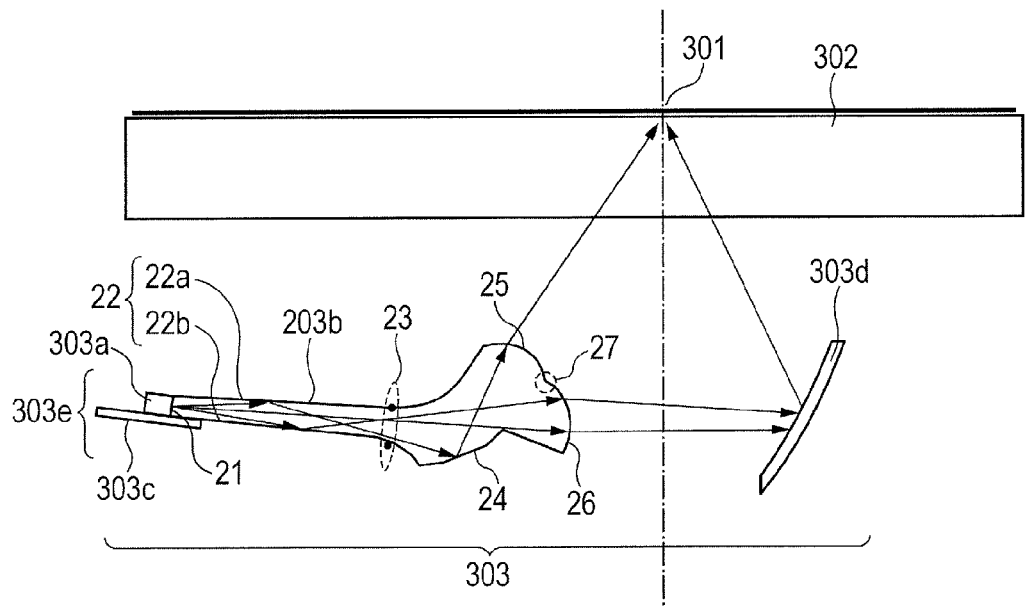
FIG. 9 is a sub-scanning cross-sectional view of an illumination apparatus according to a third embodiment of the present invention.

FIG. 9 is a sub-scanning cross-sectional view of an illumination apparatus according to a third embodiment of the present invention. An image reading apparatus according to the third embodiment is the same as that of the first embodiment, and therefore, a description thereof is omitted. In this embodiment, unlike the first and second embodiments, in order to further reduce the unevenness in illuminance in the main scanning direction, first and second exit surfaces 25 and 26 are configured to have a scattering pattern by a grain finish. Therefore, the light amount is decreased due to the scattering pattern. However, in order to compensate for the decrease of the light amount, powers of a reflecting surface 24, the first and second exit surfaces 25 and 26, and a reflecting member 303d are optimized, to thereby maintain the condensing efficiency in the sub-scanning direction equivalent to that of the second embodiment.

In this embodiment, specific curvature radii are: R=25 mm at the reflecting surface 24; R=2.05 mm at the first exit surface 25; and R=1.85 mm at the second exit surface 26. Further, $\phi1=0.24$, $\phi2=0.26$, and $\phi/\phi2=0.90$, satisfying Expression (1).

Further, WL=0.7 mm, W=0.75 mm, L1=9.6 mm, L2=3.7 mm, $\theta1=4.5°$, $\theta2=0°$, W/(L1+L2)=0.06, and ((L1 tan $\theta1$)+(L2 tan $\theta2$))/(L1+L2)=0.05, satisfying Expressions (2), (3), and (4).

In addition, L3=3.95 mm, L4=7.5 mm, L2/L1=0.39, L3/L2=1.07, and L4/L2=2.03, satisfying Expressions (5), (6), and (7). Further, the reflecting member 303d is configured to have a curvature radius of R=20 mm.

Modification Example

In the above-mentioned embodiments, an LED array in which multiple white LEDs are arranged in the main scanning direction is used as the light source. However, a single line-shaped light source such as a xenon lamp may be arranged in the main scanning direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-038583, filed Feb. 24, 2012, which is hereby incorporated by reference herein in its entirety.

What is claimed is:

1. An illumination apparatus configured to illuminate a surface to be illuminated from a first side and a second side different from the first side, the illumination apparatus comprising:
   a light guide; and
   a reflecting member,
   wherein the light guide comprises:
      an incident surface into which a light beam from a light source arranged in a one-dimensional direction enters;
      a side surface for totally reflecting a portion of the light beam which enters the incident surface;
      a reflecting surface arranged on an opposite side of the incident surface with respect to the side surface;
      a first exit surface for causing a light beam reflected by the reflecting surface to exit as a converging light beam, the first exit surface having a condensing action in a plane orthogonal to the one-dimensional direction, the converging light beam emitted from the first exit surface illuminates the surface to be illuminated as a light beam from the first side; and
      a second exit surface for causing a light beam from the light source, which is not reflected by the reflecting surface, to exit as a converging light beam, the second exit surface having a condensing action in the plane orthogonal to the one-dimensional direction, and
   wherein the reflecting member is configured to reflect the light beam from the second exit surface to the surface to be illuminated as a light beam from the second side, and
   wherein the light guide comprises a separating boundary between the first exit surface and the second exit surface, the separating boundary defining a concave portion.

2. An illumination apparatus according to claim 1, wherein the reflecting surface is formed into a curved shape having a positive power in the plane orthogonal to the one-dimensional direction.

3. An illumination apparatus according to claim 1, wherein the reflecting member is formed into a curved shape having a power in the plane orthogonal to the one-dimensional direction.

4. An illumination apparatus according to claim 1, wherein the incident surface is a planar surface.

5. An illumination apparatus according to claim 1, wherein the following expression is satisfied:

$$0.6 < \phi_1/\phi_2 < 0.95,$$

where $\phi_1$ represents a power of the first exit surface and $\phi_2$ represents a power of the second exit surface in the plane orthogonal to the one-dimensional direction.

6. An illumination apparatus according to claim 1, wherein the following two expressions are satisfied:

$$WL < W; \text{ and}$$

$$0 < W/(L1+L2) < 0.15,$$

where WL represents a width of the light source, W represents a width of the incident surface, L1 represents a distance from the incident surface to an end portion of the side surface on a side farther from the light source in a direction of a light incident axis, and L2 represents a distance from the end portion of the side surface on the side farther from the light source to the reflecting surface in the plane orthogonal to the one-dimensional direction.

7. An illumination apparatus according to claim 1, wherein the following expression is satisfied:

$$0 < ((L1\tan\theta_1)+(L1\tan\theta_2))/(L1+L2) < 0.13,$$

where L1 represents a distance from the incident surface to an end portion of the side surface on a side farther from the light source in a direction of a light incident axis, L2 represents a distance from the end portion of the side surface on the side farther from the light source to the reflecting surface, $\theta_1$ represents an angle between the side surface closest to the surface to be illuminated among side surfaces constituting the side surface and the light incident axis, and $\theta_2$ represents an angle between a side surface farthest from the surface to be illuminated among the side surfaces constituting the side surface and the incident axis in the plane orthogonal to the one-dimensional direction.

8. An illumination apparatus according to claim 1, wherein the following three expressions are satisfied:

$$0.15 < L2/L1 < 0.8;$$

$$0.5 < L3/L2 < 1.5; \text{ and}$$

$$1.2 < L4/L2 < 2.5,$$

where L1 represents a distance from the incident surface to an end portion of the side surface on a side farther from the light source in a direction of a light incident axis, L2 represents a distance from the end portion of the side surface on the side farther from the light source to the reflecting surface, L3 represents a distance from the reflecting surface to the first exit surface in a direction of the light incident axis, and L4 represents a distance from the end portion of the side surface on the side farther from the light source to the second exit surface in the plane orthogonal to the one-dimensional direction.

9. An illumination apparatus according to claim 1, wherein the light guide comprises a surface connected from an end portion of the side surface on a side farther from the light source to the first exit surface and a surface connected from the end portion of the side surface on the side farther from the light source to the reflecting surface, both the surfaces comprising continuous curved surfaces extending outward.

10. An illumination apparatus according to claim 1, wherein the light guide comprises a surface connected from the reflecting surface to the second exit surface, the surface comprising a continuous curved surface extending outward.

11. An illumination apparatus according to claim 1, wherein each of the first exit surface and the second exit surface comprises, in the one-dimensional direction, multiple toric surface regions each having a curvature in the one-dimensional direction.

12. An illumination apparatus according to claim 1, wherein the light source comprises one of multiple LEDs arranged in the one-dimensional direction and a single xenon lamp arranged in the one-dimensional direction.

13. An image reading apparatus, comprising:
   an illumination apparatus configured to illuminate a surface to be illuminated from a first side and a second side different from the first side, the illumination apparatus comprising:
   a light guide; and
      a reflecting member,
      wherein the light guide comprises:
         an incident surface into which a light beam from a light source arranged in a one-dimensional direction enters;
         a side surface for totally reflecting a portion of the light beam which enters the incident surface;
         a reflecting surface arranged on an opposite side of the incident surface with respect to the side surface;

a first exit surface for causing a light beam reflected by the reflecting surface to exit as a converging light beam, the first exit surface having a condensing action in a plane orthogonal to the one-dimensional direction, the converging light beam emitted from the first exit surface illuminates the surface to be illuminated as a light beam from the first side; and a second exit surface for causing a light beam from the light source, which is not reflected by the reflecting surface, to exit as a converging light beam, the second exit surface having a condensing action in the plane orthogonal to the one-dimensional direction, and wherein the reflecting member is configured to reflect the light beam from the second exit surface to the surface to be illuminated as a light beam from the second side;

an original table;

a reading unit; and an image forming optical system configured to image the light beam reflected by a surface of an original as the surface to be illuminated on the reading unit, wherein the light guide comprises a separating boundary between the first exit surface and the second exit surface, the separating boundary defining a concave portion.

14. A light guide comprising:

an incident surface, elongated in a first direction, configured to allow a light beam to enter the light guide;

a side surface configured to totally reflect the light beam from the incident surface;

a reflecting surface configured to reflect the light beam from the side surface;

a first exit surface configured to allow the light beam from the reflecting surface to exit; and a second exit surface configured to allow a light beam from the incident surface, which is not reflected on the reflecting surface, to exit, wherein the first and second exit surfaces are disposed adjacent to each other and have a condensing function in a first section perpendicular to the first direction, and wherein a separating boundary between the first exit surface and the second exit surface defines a concave portion.

15. The light guide according to claim 14, wherein the reflecting surface has a positive power in the first section.

16. An illumination apparatus which illuminates a surface to be illuminated, comprising:

a plurality of light sources arranged in a first direction;

an incident surface configured to allow light beams from the plurality of light sources to enter;

a side surface configured to reflect the light beams from the incident surface;

a reflecting surface configured to reflect the light beams from the side surface;

a first exit surface configured to allow the light beams from the reflecting surface to exit; and a second exit surface configured to allow light beams from the incident surface, which are not reflected on the reflecting surface, to exit, wherein the first and second exit surfaces are disposed adjacent to each other and have a condensing function in a first section perpendicular to the first direction, and wherein a separating boundary between the first exit surface and the second exit surface defines a concave portion.

17. The illumination apparatus according to claim 16, comprising a reflecting member configured to guide light beam from the second exit surface to the surface to be illuminated.

18. The illumination apparatus according to claim 17, wherein the first exit surface and the reflecting member are configured to guide light beams to the surface to be illuminated from both sides of a reading optical axis.

19. The illumination apparatus according to claim 17, wherein the reflecting member has a power in the first section.

* * * * *